United States Patent [19]
Nelson

[11] 3,892,370
[45] July 1, 1975

[54] FILM SPOOL

[75] Inventor: Norman E. Nelson, Roseville, Minn.

[73] Assignee: Minnesota Mining and Manufacturing Company, St. Paul, Minn.

[22] Filed: Nov. 26, 1973

[21] Appl. No.: 418,912

Related U.S. Application Data

[63] Continuation of Ser. No. 58,071, July 24, 1970, abandoned.

[52] U.S. Cl. .............................. 242/71.8; 242/197
[51] Int. Cl. ..................... B65h 75/28; B65h 75/14
[58] Field of Search ........... 242/71.8, 118.41, 118.7, 242/71.1, 55.2, 197, 195, 76; 206/53

[56] References Cited
UNITED STATES PATENTS

| | | | |
|---|---|---|---|
| 2,894,620 | 7/1959 | Campbell, Jr. | 292/71.8 |
| 2,958,972 | 11/1960 | Morin | 242/118.7 X |
| 3,104,846 | 9/1963 | Ringle | 242/71.1 |
| 3,160,361 | 12/1964 | Monahan | 242/55.2 |
| 3,254,856 | 6/1966 | Camras | 242/71.8 X |

Primary Examiner—George F. Mautz
Attorney, Agent, or Firm—Alexander, Sell, Steldt & Delahunt

[57] ABSTRACT

A film spool comprising a barrel and transverse end flanges having inwardly facing or opposed surfaces that define the film-storage area. A circumferentially extending ridge, radially spaced from the barrel, is formed on the inwardly facing surface of each flange and projects toward the ridge on the inwardly facing surface of the other flange. The distance between the ridges on the two flanges is slightly less than the width of film to be wound on the spool so that the ridges hold the film in a supply roll on the spool, but the leading end of the film may be drawn between the ridges with a uniform, moderate pulling force. A spool of the invention may be molded as an integral body, with the edge-portions of the flanges being pivotable in a toggle-like action from the position in which they are molded to the position in which the ridges have the described spacing.

1 Claim, 2 Drawing Figures

INVENTOR.
NORMAN E. NELSON
BY Kinney, Alexander,
Sell, Steldt & DeLaHunt
ATTORNEYS 3,892,370

FILM SPOOL

This application is a continuation of application Ser. No. 58,071, filed July 24, 1970, now abandoned.

For the most satisfying operation of a camera, the photographic film in the camera should be held in a tight supply roll from which it may be pulled by a uniform, moderate pulling force. If the film clocksprings off of the supply roll, or if a nonuniform pulling force is required, the film-advancing operation will be jerky. In addition, clockspringing of the film may cause it to rub against the surfaces of adjacent camera parts, whereupon the film is scratched or otherwise marked.

The present invention provides a new film spool on which film is held in the desired tight supply roll and from which film may be unwound with a uniform and moderate pulling force. The spool further has the advantage that it may be easily filled with film in a factory operation that does not require the lead end of the film to be taped to the spool. Also, the new spool is inexpensively molded from plastic and can be molded as one integral body.

Briefly, a spool of the present invention comprises a barrel; end flanges attached to the ends of the barrel and extending transversely to the barrel so that their inwardly facing, opposed, substantially parallel surfaces define a film-storage area; and a short circumferentially extending ridge attached near the edge of the inwardly facing surface of each flange and projecting axially inwardly, that is, toward the ridge on the other flange. The inwardly facing, opposed, substantially parallel surfaces of the flanges are separated over most of their extent by at least a distance equal to the width of film to be wound on the spool. On the other hand, the axially innermost edges of the ridges on the flanges are spaced from one another by a distance that is slightly less than the width of film to be wound on the spool. Thus, the outer winding of film in a supply roll on the spool is held in the roll, but the leading end of the film may be drawn between the ridges with a uniform moderate pulling force.

Preferably a spool of the invention is molded from plastic as an integral body. The radially outer edge-portions of the flanges of such an integrally molded spool, which carry the roll-defining ridges, are pivotable from the position in which they are molded to an operative position. In the molded position of the edge-portions of the flanges, the axially innermost edges of the ridges are spaced from one another by a distance at least as great as the distance between the rest of the faces of the flanges, while in the operative position they have the spacing described above. The edge-portions of the flanges tend to remain in the operative position when placed in that position, because during their described pivotal movement their extreme outer portions are momentarily and resiliently stretched to a circumference greater than their circumference as molded.

DETAILED DESCRIPTION

Figure 1:
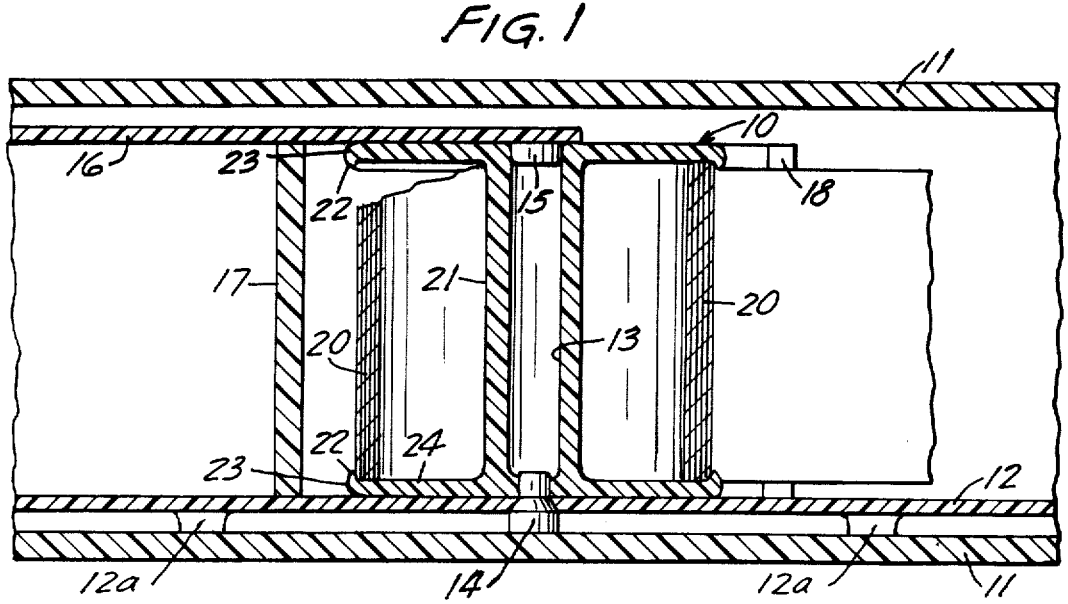
FIG. 1 is a cross-section through a spool of the invention in place in a camera.

The spool 10 in FIG. 1 is mounted within a camera case 11 and supported on a base plate 12 that is separated from the case by spacers 12a. It has a central bore 13 and rotates about short spindles 14 and 15 that extend into that bore. The spindle 14 is supported on the camera case 11 (as by being molded integrally with the case) and extends through the base plate 12, and the spindle 15 is supported on a support arm 16 that is attached to a support member (not illustrated) that is mountd on the base plate. A floating cylindrical sleeve 17 is coaxial with and surrounds the film spool 10 to further protect film stored on the spool from ambient light. The sleeve 17 has a slot 18 in one side through which film stored on the spool 10 can be drawn to a take-up spool or the like in the camera. One especially advantageous use for a spool of the invention in an arrangement such as shown in FIG. 1 is in a preloaded camera, that is, a camera loaded with film when sold to a user and returned by the user when the film has been exposed.

As shown in FIG. 1, film 20 stored on the spool 10 need not be attached to the barrel 21 of the spool. Instead the film is simply held in a supply roll by ridges 22 formed around the circumference of the inwardly facing surfaces 24 of circular end flanges 23 of the spool. While the distance between the inner faces 24 of the flanges 23 is at least equal to the width of film that is to be stored on the spool, the axial distance between the axially innermost edges of the ridges 22 is slightly less than the width of film to be stored on the spool and as a result the ridges hold film on the spool in a supply roll. However, the flanges and ridges are somewhat flexible so that they can spring apart slightly, and film stored on the spool is generally flexible so that it can curve over its width, whereby film is readily drawn off of the roll. Since the amount of interference is constant, the pulling force required to draw the film from the roll is also constant. The most satisfactory operation and the lowest pulling force occur if the spool 10 is rotatable, but it need not be rotatable.

The interference by the ridges 22 with the film should be sufficient to hold film in a roll but not damage the film as it is pulled from the roll. The needed interference will vary with the thickness of the portion of the flange that may flex to permit film to be drawn from a supply roll, the material of the flange, and the kind, thickness, etc. of film wound on the spool. For example, for one useful spool made from polycarbonate in which the thickness of the portion T of the flange in FIG. 2 was 10 mils and which was intended for use with 26-millimeter-wide photographic film having a cellulose triacetate backing coated with three-color separation negative emulsions, the axially innermost edges of the ridges were spaced about 20 mils less than the width of the film.

Figure 2:
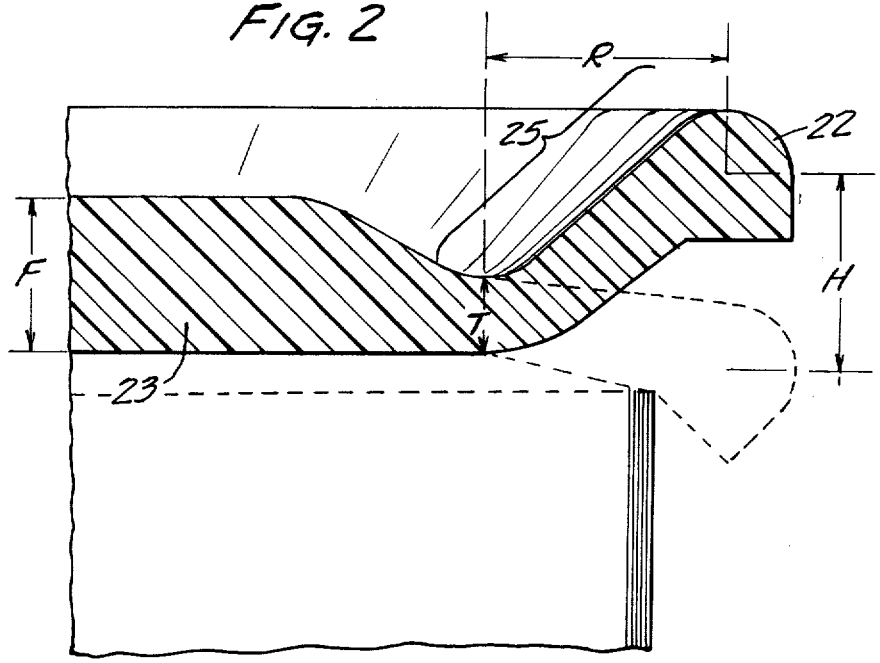
FIG. 2 is a cross-section through an outer edge-portion of a spool of the invention.

FIG. 2 illustrates how the film spool 10 may be conveniently molded as one integral body. The problem with integrally molding a spool such as the spool 10 is that the axially inward extension of the ridges 22 makes it difficult to construct a mold that may be simply and conveniently withdrawn from the completed spool. In the spool of this invention that problem is solved by molding the spool with edge-portions 25 of the flanges 23 turned upwardly out of their operative position, as illustrated in solid lines in FIG. 2. With the illustrated spool, the mold parts between the flanges may be simply withdrawn from the spool radially. After the spool has been molded, the edge-portions 25 are pivoted downwardly into their operative position shown in broken lines. Since the edge-portions 25 pass through a position in which their circumference is larger than their circumference as molded, the pivotal movement has a toggle-type action, and the edge-portions will tend to remain in the position to which they are pivoted. A convenient way to pivot the edge-portions 25 after the molding operation is completed is with a tool having one part that engages and supports the inwardly facing surface 24 of the flange out to the edge portion and another part that engages the outwardly facing surface of the flange and at one time pivots the whole circumferential extent of the edge-portion 25 to its operative position.

The dimensions of the flanges and the material from which the flanges are molded are chosen to permit the deformation illustrated in FIG. 2. In one useful spool, the dimension F in FIG. 2 was 20 mils, T was 10 mils, R was 30 mils, and H was 25 mils. Useful materials from which the flanges or the whole spool may be molded include polyacetals (such as Delrin), polycarbonates (such as Lexan), nylon, and polyphenylene oxide (such as Noryl).

The ridges 22 are shown in the drawings as continuous and extending around the whole circumference of the surfaces 24 of the flanges 23, and that is their preferred construction. However, film on a spool will also be held in a supply roll with a circumferentially extending ridge that is interrupted over its length. Further, although the preferred spool has been shown as one integral body, it may be molded as two or more parts. Preferably, even then, however, each flange and the ridge carried on the flange are one integral body.

With conventional spool-loading equipment, the end of the film will be attached to the barrel 21 of the spool, as by taping it there, and the spool will then be rotated until a sufficient amount of film has been wound on the spool. However, film can also be loaded onto the spool of this invention by simply guiding the lead end of the film into the space defined by the ridges 22. The film will then curve into a roll form and will be held within the ridges 22.

While the invention has been described with respect to a spool for photographic film, for which the invention is especially adapted, spools of the invention are also useful to contain many other film or web materials such as coils of paper, varieties of plastic film, or metal.

What is claimed is:

1. An integrally molded plastic spool for containing a supply roll of predetermined film comprising
   1. a barrel;
   2. a circular flange attached to each of the two ends of the barrel and extending transversely to the barrel, the inwardly facing surfaces of the flanges being substantially parallel to one another and separated over most of their extent by at least a distance equal to the width of said predetermined film; and
   3. a low ridge extending around the whole circumference of the inwardly facing surface of each flange, radially spaced from the barrel and projecting toward the other flange; the thickness of the flanges being reduced in an area that is spaced inwardly from the outer edge of the flanges and extends circumferentially around the flanges, whereby the edge-portions of the flanges that carry the ridges are pivotable between two stable positions in which the edge-portions will remain until pressure is applied to move them to the other of the two stable positions, said stable positions comprising a) a first molded position in which the distance between the ridge on one flange and the ridge on the other flange is at least as great as the distance between the rest of the inwardly facing surfaces of the flanges and b) an operative position in which the distance between the ridges is slightly less than the width of said predetermined film, said edge-portions of the flanges having a circumference in the first and operative positions that is less than the circumference to which they are momentarily and resiliently stretched during pivoting from the first position to the operative position, whereby the edge-portions tend to remain in their operative position and the ridges hold the outer winding of film in a supply roll on the spool, but the free end of the film may be drawn between the ridges with a uniform moderate pulling force.

* * * * *